United States Patent
Lin et al.

(10) Patent No.: US 9,867,338 B2
(45) Date of Patent: Jan. 16, 2018

(54) SYSTEM FOR SUPPLEMENTING LIGHT TO PLANTS

(71) Applicant: WESTBRIDGE AUTOMATION (XIAMEN) CO., LTD, Xiamen (CN)

(72) Inventors: Yaoliang Lin, Xiamen (CN); Russell Paul Winnett, Murrieta, CA (US)

(73) Assignee: WESTBRIDGE AUTOMATION (XIAMEN) CO., LTD., Xiamen (CN)

( * ) Notice: Subject to any disclaimer, the term of this patent is extended or adjusted under 35 U.S.C. 154(b) by 566 days.

(21) Appl. No.: 14/327,063

(22) Filed: Jul. 9, 2014

(65) Prior Publication Data

US 2015/0016105 A1     Jan. 15, 2015

Related U.S. Application Data

(60) Provisional application No. 61/844,175, filed on Jul. 9, 2013.

(51) Int. Cl.
| | |
|---|---|
| *A01G 7/04* | (2006.01) |
| *F21V 21/008* | (2006.01) |
| *F21S 2/00* | (2016.01) |
| *F21V 21/005* | (2006.01) |
| *F21Y 105/00* | (2016.01) |
| *F21Y 115/10* | (2016.01) |

(52) U.S. Cl.
CPC .............. *A01G 7/045* (2013.01); *F21S 2/005* (2013.01); *F21V 21/005* (2013.01); *F21V 21/008* (2013.01); *F21Y 2105/00* (2013.01); *F21Y 2115/10* (2016.08); *Y02P 60/149* (2015.11)

(58) Field of Classification Search
CPC ....... F21S 2/005; F21V 21/005; F21V 21/008
See application file for complete search history.

(56) References Cited

U.S. PATENT DOCUMENTS

| | | | |
|---|---|---|---|
| 6,488,387 B2* | 12/2002 | Wardenburg | A01G 7/045 362/220 |
| 8,522,494 B2* | 9/2013 | Ward | F21S 2/00 52/174 |
| 9,140,436 B2* | 9/2015 | Lu | F21V 21/005 |
| 9,261,264 B1* | 2/2016 | Ward | F21S 2/00 |
| 2010/0110687 A1* | 5/2010 | Zheng | F21S 2/005 362/249.06 |
| 2010/0195350 A1* | 8/2010 | Schattinger | G09F 9/33 362/612 |
| 2012/0140473 A1* | 6/2012 | Chang | F21S 2/005 362/249.03 |
| 2012/0300437 A1* | 11/2012 | Lu | F21V 21/005 362/147 |
| 2014/0292198 A1* | 10/2014 | Sanders | F21V 15/01 315/86 |

(Continued)

*Primary Examiner* — Anabel Ton
(74) *Attorney, Agent, or Firm* — Workman Nydegger

(57) ABSTRACT

The invention relates to the field of horticulture in a greenhouse and disclosures a system for supplementing light to plants, the system including a lighting grid and a power supply detachable from each other, wherein: the lighting grid includes a plurality of LED panels, wherein a plurality of LED lamps are arranged in each LED panel, and any adjacent LED panels are joined to each other by a joining member; and the power supply is electrically connected with the LED lamps in the respective LED panels through a cable.

12 Claims, 8 Drawing Sheets

(56) References Cited

U.S. PATENT DOCUMENTS

| | | | |
|---|---|---|---|
| 2015/0055343 A1* | 2/2015 | Liao | F21S 2/005 |
| | | | 362/249.03 |
| 2015/0267907 A1* | 9/2015 | Thompson | F21V 23/06 |
| | | | 362/249.06 |

* cited by examiner

SYSTEM FOR SUPPLEMENTING LIGHT TO PLANTS

RELATED APPLICATIONS

The present application claims priority to, and the benefit of, U.S. Provisional Patent Application Ser. No. 61/844,175, filed on Jul. 9, 2013, the disclosure of which is incorporated herein by reference in its entirety.

FIELD

The present invention relates to the field of horticulture in a greenhouse and particularly to a system for supplementing light to plants.

BACKGROUND

It is necessary for successful horticulture in a greenhouse to provide light sources at specific luminosities and colors/spectrums to plants grown inside the greenhouse so as to facilitate the photosynthesis of the plants. Typically artificial light sources, i.e., plant supplemental lamps, is provided as the light sources for the plants grown inside the greenhouse, and at present a major challenge is how the plant supplemental lamps provide light energy required for the plants to grow.

At present plant LED lamps is typically provided as the artificial light sources for horticulture in the greenhouse, where the plants in a growing area of the greenhouse are grown at a sequence of locations under the plant LED lamps so that lighting is provided by the plant LED lamps to all the pants in the growing area.

However the existing plant LED lamps have a low profile and are compact, and their LED chips are concentrated in a small footprint resulting in small areas of the light sources; and the Plant LED lamps are hung over the plants, and the area of the growing area is much larger than the areas of the light sources of the plant LED lamps. As per the inverse square law of light radiation, the longer the distance from a light source is, the lower the amount of radiated light energy will be. If the distance of a plant from a light source is doubled, then the amount of light energy with which the plants are radiated will be lowered by a factor of ¼. As can be apparent from the simple calculation, it is impossible to provide all the plants with light at the same radiated energy from the compact plant LED lamps hung over the growing area of a large area, where only the plants in a fraction of the area immediately below the plant LED lamps are radiated with sufficient light energy, but the plants outside the area immediately below the plant LED lamps are radiated with light energy down to 25%, thus resulting in non-uniform growing of the plants in the same growing area.

SUMMARY

The invention provides a system for supplementing light to plants, which can provide all the plants in a growing area with uniform light energy so as to improve the uniformity of growing of the plants inside a greenhouse.

In order to attain the foregoing object, the invention provides the following technical solutions:

A system for supplementing light to plants includes a lighting grid and a power supply detachable from each other, wherein:

the lighting grid includes a plurality of LED panels, wherein a plurality of LED lamps are arranged in each LED panel, and any two adjacent LED panels are joined to each other by a joining member; and the power supply is electrically connected with the LED lamps in the respective LED panels through a cable.

In the system for supplementing light to plants above, the plurality of LED panels are joined into the lighting grid, and the plurality of LED lamps are arranged in each LED panel; and given the total power, the LED lamps in each LED panel can be embodied as small-power LED chips to thereby extend the areas of light sources of the system for supplementing light to plants. Moreover the respective LED panels can be joined into the lighting grid in a pattern adjusted according to a growing area so that the LED lamps in the respective LED panels are embodied as planar light sources facing the growing area of the plants, and the respective plants in the growing area can be radiated uniformly with light rays emitted by the respective LED lamps so that the system for supplementing light to plants above provide all the plants in the growing area with uniform light energy.

Thus the system for supplementing light to plants provide all the plants in a growing area with uniform light energy so as to improve the uniformity of growing of the plants inside a greenhouse.

Also the power supply is detachable from the lighting grid, and the power supply is electrically connected with the LED lamps in the respective LED panels through the cable, so the power supply can be arranged outside of a greenhouse in practical use so that heat generated by the power supply in operation can be dissipated directly outside of the greenhouse without any fan, water cooler or another system arranged in the greenhouse to process the heat generated by the power supply to thereby improve energy saving of the system for supplementing light to plants above.

Preferably in the lighting grid the plurality of LED panels are distributed in an array, wherein any two adjacent LED panels in each row of LED panels are joined to each other, and any two adjacent LED panels in each column of LED panels are joined to each other; or the plurality of LED panels are arranged in a row, and any two adjacent LED panels are joined to each other.

Preferably each LED panel is provided with a frame including four edges connected end-to-end sequentially.

Preferably the first one of the four edges of the first one of any two adjacent LED panels is adjacent to the second LED panel, and the second one of the four edges of the second LED panel is adjacent to the first LED panel, and the first edge is arranged parallel to and against the second edge, and wherein:

the lengthwise direction of the joining member is parallel to the lengthwise direction of the first edge, and the joining member is formed with a slot into which both the first edge and the second edge are inserted; and the slot has a first wall located on the side of the first edge away from the second edge and a second wall located on the side of the second edge away from the first edge, and the first wall is arranged against and engaged with the surface of the first edge away from the second edge, and the second wall is arranged against and engaged with the surface of the second edge away from the first edge.

Preferably the first wall is arranged against and engaged with the surface of the first edge away from the second edge and the second wall is arranged against and engaged with the surface of the second edge away from the first edge in such a way that:

the surface of the first edge away from the second edge is formed with limiting slot;

the surface of the second edge away from the first edge is formed with a limiting slot;

the first wall is formed with a first limiting block engaged with the limiting slot of the first edge; or the first wall is formed with an adjustable bolt including an inner end inserted into the slot and arranged against with the bottom of the limiting slot of the first edge and engaged with the limiting slot of the first edge; and the second wall is formed with a second limiting block engaged with the limiting slot of the second edge.

Preferably the first wall is arranged against and engaged with the surface of the first edge away from the second edge and the second wall is arranged against and engaged with the surface of the second edge away from the first edge in such a way that:

the surface of the first edge away from the second edge is formed with a limiting slot;

the surface of the second edge away from the first edge is formed with a limiting slot;

the first wall is formed with a limiting slot engaged with a limiting block formed on the first edge; and the second wall is formed with a limiting slot engaged with a limiting block formed on the second edge.

Preferably adjacent corners in any adjacent LED panels are fastened to each other by one of the joining members to have the adjacent LED panels joined to each other, and wherein the joining member includes:

fasteners, including fastening holes, arranged at the corners of the frames of the LED panels; and a connection plate, including vias corresponding to the fastening holes, fastened to the fasteners by connection bolts.

Preferably the joining member further includes clamps to clamp the joining edges in the frames of the respective adjacent LED panels.

Preferably the system for supplementing light to plants further includes a lifter connected with the lighting grid to adjust the vertical height of the lighting grid.

Preferably the lifter further includes:

a drive shaft fastened to a wall of a greenhouse;

a cord, wound on the drive shaft, with one end fastened to the drive shaft and the other end connected with the lighting grid; and a steering component, fastened to the wall of the greenhouse, including a rotation axis vertically located immediately above the lighting grid to steer the cord so that the section of the rode between the rotation axis and the lighting grid extends vertically.

Preferably each LED lamp in the lighting grid is a monochromatic light source, and the plurality of LED lamps emit light rays in various colors.

Preferably the system for supplementing light to plants further includes a controller connected in signaling with the power supply to control the power supply to control the strengths of light rays emitted by the LEDs in the respective LED panels separately according to a preset rule

DETAILED DESCRIPTION OF THE EMBODIMENTS

The technical solutions in the embodiments of the invention will be described below clearly and fully with reference to drawings in the embodiments of the invention, and apparently the drawings to be described below are merely illustrative of a part but not all of the embodiments of the invention. All the other embodiments that can be derived by those ordinarily skilled in the art based upon the embodiments here of the invention without any inventive effort shall fall into the claimed scope of the invention.

Figure 1:
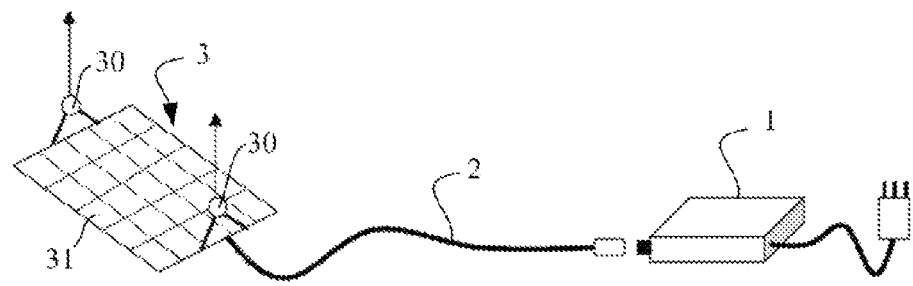
FIG. 1 is a schematic structural diagram of a system for supplementing light to plants according to an embodiment of the invention.

As illustrated in FIG. 1, the invention provides a system for supplementing light to plants, which includes a lighting grid 3 and a power supply 1 detachable from each other, where:

The lighting grid 3 includes a plurality of LED panels 31, where a plurality of LED lamps are arranged in each LED panel 31, and any adjacent LED panels are joined to each other by a joining member; and The power supply 1 is electrically connected with the LED lamps in the respective LED panels 31 through a cable.

In the system for supplementing light to plants above, the plurality of LED panels 31 are joined into the lighting grid 3, and the plurality of LED lamps are arranged in each LED panel 31; and given the total power, the LED lamps in each LED panel 31 can be embodied as small-power LED chips to thereby extend the areas of light sources of the system for supplementing light to plants. Moreover the respective LED panels 31 can be joined into the lighting grid 3 in a pattern adjusted according to a growing area so that the LED lamps in the respective LED panels 31 are embodied as planar light sources facing the growing area of the plants, and thus the respective plants in the growing area can be radiated uniformly with light rays emitted by the respective LED lamps so that the system for supplementing light to plants above provide all the plants in the growing area with uniform light energy.

Thus the system for supplementing light to plants above can provide all the plants in the growing area with uniform light energy so as to improve the uniformity of growing of the plants inside a greenhouse.

Moreover in the system for supplementing light to plants above, the power supply 1 is detachable from the lighting grid 3, and the power supply 1 is electrically connected with the LED lamps in the respective LED panels 31 through the cable 2, so the power supply 1 can be arranged outside of the greenhouse in practical use so that heat generated by the power supply 1 in operation can be dissipated directly outside of the greenhouse without any fan, water cooler or another system arranged in the greenhouse to process the heat generated by the power supply to thereby improve energy saving of the system for supplementing light to plants above.

Particularly in the system for supplementing light to plants above, the cable 2 has one end connected with the power supply 1 through a quick connector and the other end electrically connected with the LED lamps in the respective LED panels 31 through a multi-contact quick connector. The quick connector and the multi-contact quick connector can be arranged to facilitate detaching of the power supply 1 from the LED lamps in the respective LED panels 31 in the lighting grid 3.

Figure 2:
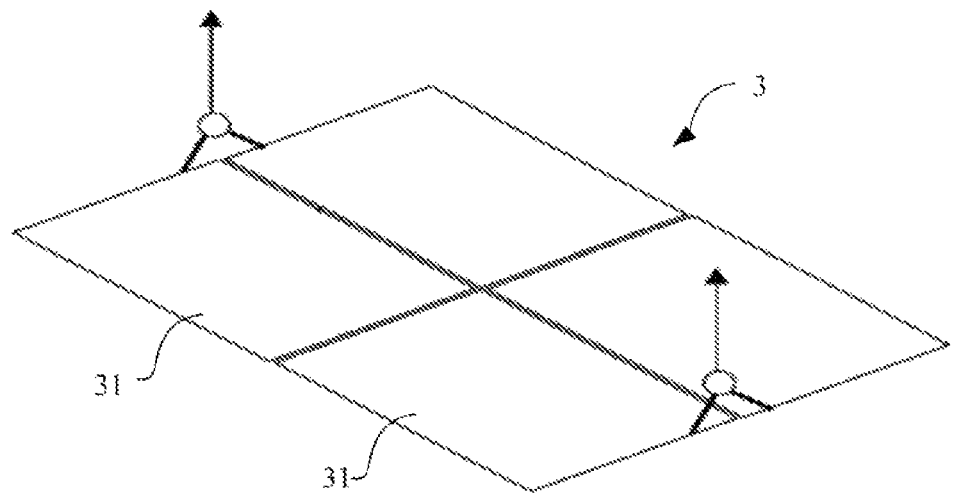
FIG. 2 is a schematic structural diagram of a lighting grid in a system for supplementing light to plants according to an embodiment of the invention.

In the system for supplementing light to plants according to the respective embodiments above, the plurality of LED panels 31 in the lighting grid 3 can be arranged in a number of patterns:

In a first pattern, as illustrated in FIG. 2, the plurality of LED panels 31 in the lighting grid 3 are distributed in an array, where any two adjacent LED panels 31 in each row of LED panels 31 are joined to each other, and any two adjacent LED panels 31 in each column of LED panels 31 are joined to each other.

Figure 3:
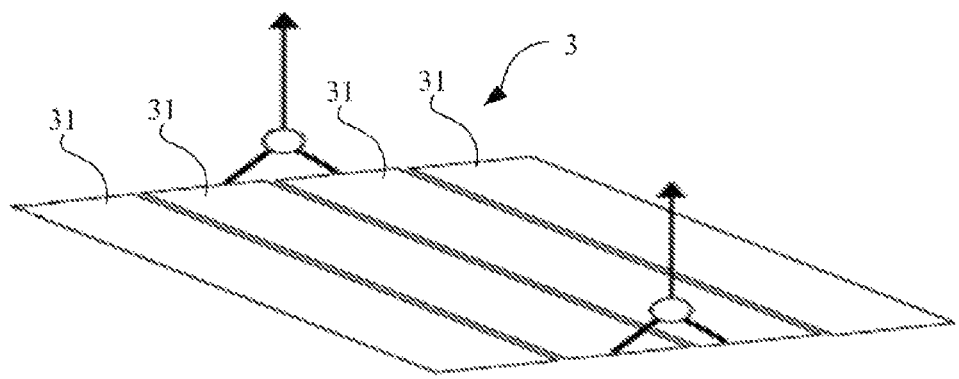
FIG. 3 is another schematic structural diagram of a lighting grid in a system for supplementing light to plants according to another embodiment of the invention.

In a second pattern, as illustrated in FIG. 3, the plurality of LED panels 31 in the lighting grid 3 are arranged in a row, and any two adjacent LED panels 31 are joined to each other.

The plurality of LED panels 31 in the lighting grid 3 are arranged in both of the patterns above so that the LED lamps in the plurality of LED panels 31 in the lighting grid 3 can be structured as planar light sources.

Figure 4:
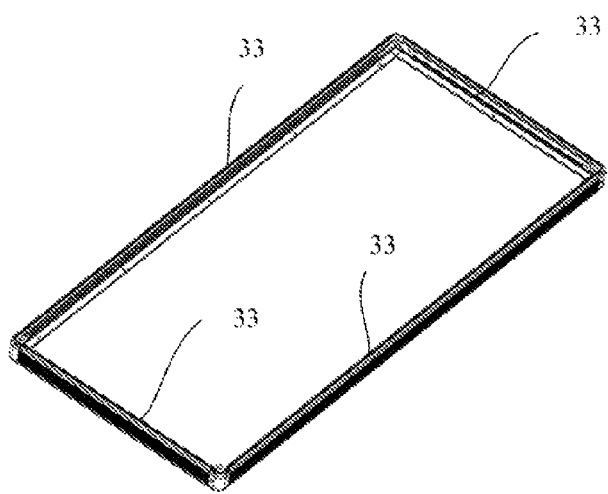
FIG. 4 is a schematic structural diagram of a frame of an LED panel in a system for supplementing light to plants according to an embodiment of the invention.

Further to the respective embodiments above, in a preferred embodiment as illustrated in FIG. 4, each LED panel 31 is provided with a frame including four edges 33 connected end-to-end sequentially so as to lower the weight of the lighting grid 3.

Preferably the LED panels 31 structured in the frame above can be LED panels made of aluminum or plastic LED panels.

Figure 5:
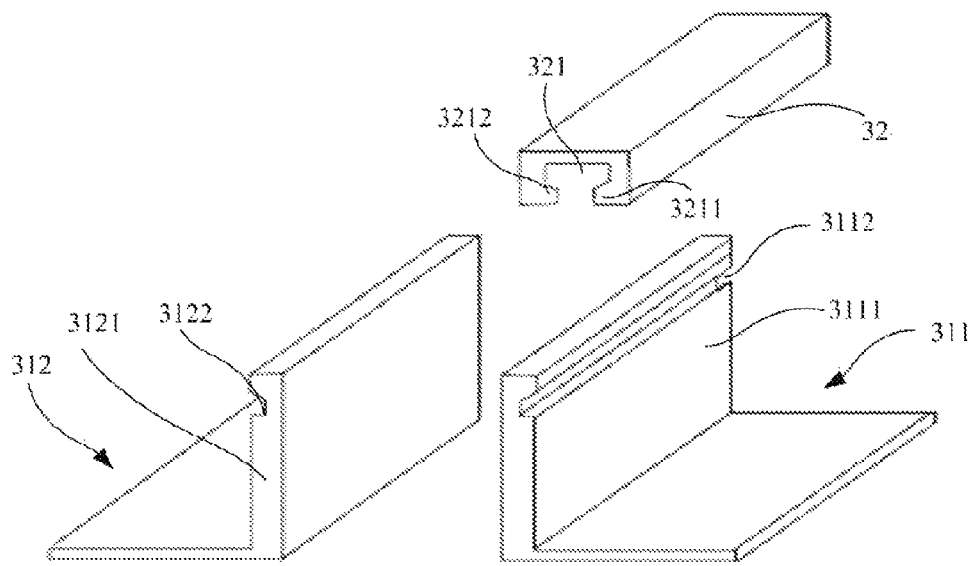
FIG. 5 is a schematic structural diagram of a joining structure between two LED panels of a lighting grid in a system for supplementing light to plants according to an embodiment of the invention.

Of course, further to the embodiment above, the adjacent LED panels 31 in the lighting grid 3 can be joined in a number of patterns when the LED panels 31 are structured in the frame:

In a first pattern, in any two adjacent LED panels 31, e.g., the first LED panel 311 and the second LED panel 312 illustrated in FIG. 5, given a joining member which is a joining member 32 as illustrated in FIG. 5, the first one 3111 of the four edges of the first LED panel 311 is adjacent to the second LED panel 312, and the second one 3121 of the four edges of the second LED panel 312 is adjacent to the first LED panel 311, and the first edge 3111 is arranged parallel to and against the second edge 3121, where:

The lengthwise direction of the joining member 32 is parallel to the lengthwise direction of the first edge 3111, and the joining member 32 is formed with a slot 321 into which both the first edge 3111 and the second edge 3121 are inserted; and the slot 321 has a first wall located on the side of the first edge 3111 away from the second edge 3121 and a second wall located on the side of the second edge 3121 away from the first edge 3111, and the first wall is arranged against and engaged with the surface of the first edge 3111 away from the second edge 3121, and the second wall is arranged against and engaged with the surface of the second edge 3121 away from the first edge 3111.

The adjacent LED panels 31 in the lighting grid 3 can be joined to each other in the structure embodied in the first pattern.

Figure 6:
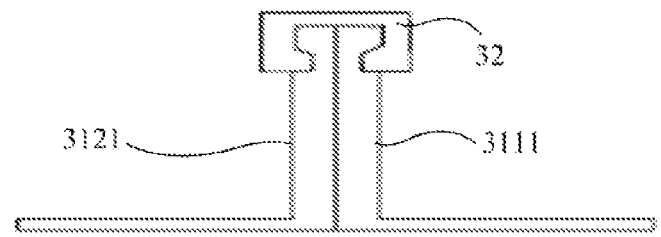
FIG. 6 is a schematic structural diagram of the two adjacent joined LED panels in the structure illustrated in FIG. 5.

Referring to FIG. 5 to FIG. 8, in the technical solution embodied in the first pattern above, the first wall can be arranged against and engaged with the surface of the first edge 3111 away from the second edge 3121 and the second wall can be arranged against and engaged with the surface of the second edge 3121 away from the first edge 3111 particularly in the following implementations:

In a first implementation, referring to FIG. 5 and FIG. 6, the surface of the first edge 3111 away from the second edge 3121 is formed with a limiting slot 3112;

The surface of the second edge 3121 away from the first edge 3111 is formed with a limiting slot 3122;

The first wall of the slot 321 in the joining member 32 is formed with a first limiting block 3211 engaged with the limiting slot 3112 of the first edge 3111; and The second wall of the slot 321 in the joining member 32 is formed with a second limiting block 3212 engaged with the limiting slot 3122 of the second edge 3121.

As illustrated in FIG. 6, the slot 321 of the joining member 32 can have the first wall arranged against and engaged with the surface of the first edge 3111 away from the second edge 3121, and the second wall arranged against and engaged with the surface of the second edge 3121 away from the first edge 3111 in the solution disclosed in the first implementation above.

Figure 7:
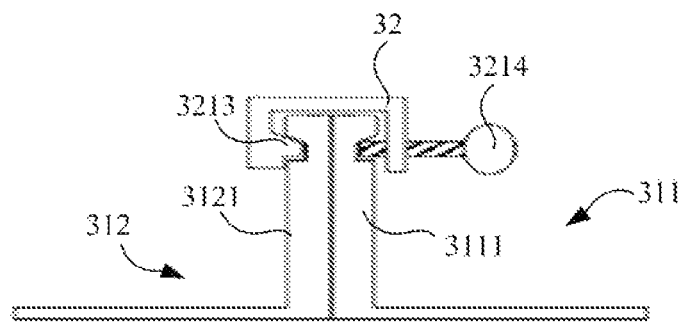
FIG. 7 is a schematic structural diagram of a joining structure between two LED panels of a lighting grid in a system for supplementing light to plants according to another embodiment of the invention.

In a second implementation, referring to FIG. 7, the surface of the first edge 3111 away from the second edge 3121 is formed with a limiting slot;

The surface of the second edge 3121 away from the first edge 3111 is formed with a limiting slot;

The first wall of the slot 321 in the joining member 32 is formed with an adjustable bolt 3214 including an inner end inserted into the slot 321 and arranged against with the bottom of the limiting slot of the first edge 3111 and engaged with the limiting slot of the first edge 3111; and The second wall of the slot 321 in the joining member 32 is formed with a second limiting block 3213 engaged with the limiting slot of the second edge 3121.

In the second implementation above, the slot 321 of the joining member 32 can have the first wall arranged against and engaged with the surface of the first edge 3111 away from the second edge 3121, and the second wall arranged against and engaged with the surface of the second edge 3121 away from the first edge 3111; and also the length by which the adjustable bolt 3214 is screwed into the slot 321 can be adjusted so that the joining member 32 can be applicable to the LED panels 31 including the first edges 3111 and the second edges 3121 varying in thicknesses.

Figure 8:
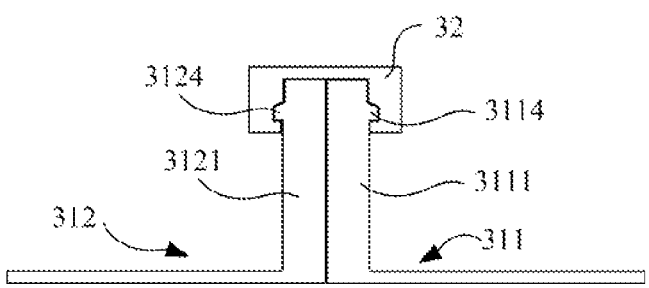
FIG. 8 is a schematic structural diagram of a joining structure between two LED panels of a lighting grid in a system for supplementing light to plants according to another embodiment of the invention.

In a third implementation, as illustrated in FIG. 8, the surface of the first edge 3111 away from the second edge 3121 is formed with a limiting slot 3114;

The surface of the second edge 3121 away from the first edge 3111 is formed with a limiting slot 3124;

The first wall of the slot 321 in the joining member 32 is formed with a limiting slot engaged with a limiting block 3114 formed on the first edge 3111; and The second wall of the slot 321 in the joining member 32 is formed with a limiting slot engaged with a limiting block 3124 formed on the second edge 3121.

In the technical solution disclosed in the third implementation above, the slot 321 of the joining member 32 can also have the first wall arranged against and engaged with the surface of the first edge 3111 away from the second edge 3121, and the second wall arranged against and engaged with the surface of the second edge 3121 away from the first edge 3111.

In a second pattern, adjacent corners in any adjacent LED panels 31 are fastened to each other by a joining member to have the adjacent LED panels 31 joined to each other, where the joining member includes:

Fasteners including fastening holes are arranged at the corners of the frames of the LED panels 31; and A connection plate including vias corresponding to the fastening holes is fastened to fasteners by connection bolts.

Figure 9:
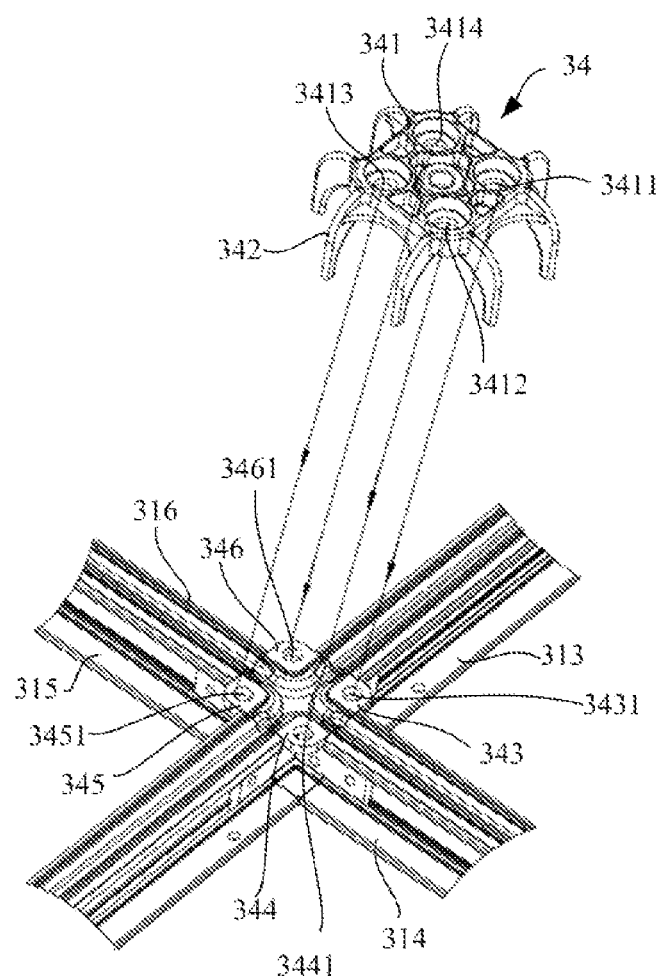
FIG. 9 is a schematic structural diagram of a joining structure between four LED panels of a lighting grid in a system for supplementing light to plants according to another embodiment of the invention.
Figure 10:
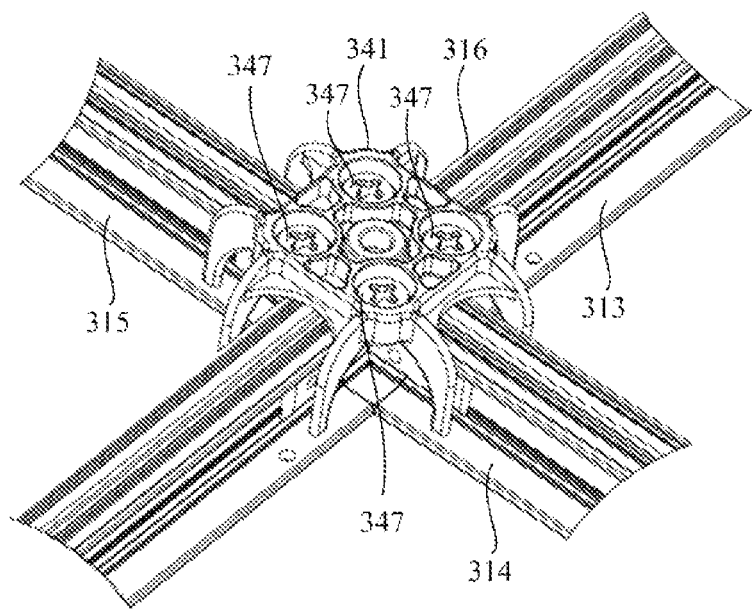
FIG. 10 is a schematic structural diagram of the four adjacent joined LED panels in the structure illustrated in FIG. 9.

As illustrated in FIG. 9, taking the LED panel 313, the LED panel 314, the LED panel 315 and the LED panel 316 illustrated in FIG. 9 as an example, given a joining member which is the joining member 34 as illustrated in FIG. 9, the joining member 34 includes:

A fastener 343 including a fastening hole 3431 is arranged at the corner of the frame of the LED panel 313;

A fastener 344 including a fastening hole 3441 is arranged at the corner of the frame of the LED panel 314;

A fastener 345 including a fastening hole 3451 is arranged at the corner of the frame of the LED panel 315;

A fastener 346 including a fastening hole 3461 is arranged at the corner of the frame of the LED panel 316; and A connection plate 341 including a via 3411 corresponding to the fastening hole 3431, a via 3412 corresponding to the fastening hole 3441, a via 3413 corresponding to the fastening hole 3441 and a via 3414 corresponding to the fastening hole 3461 is fastened to the fastener 343, the fastener 344, the fastener 345 and the fastener 346 by connection bolts 347, as illustrated in FIG. 10.

Figure 11:
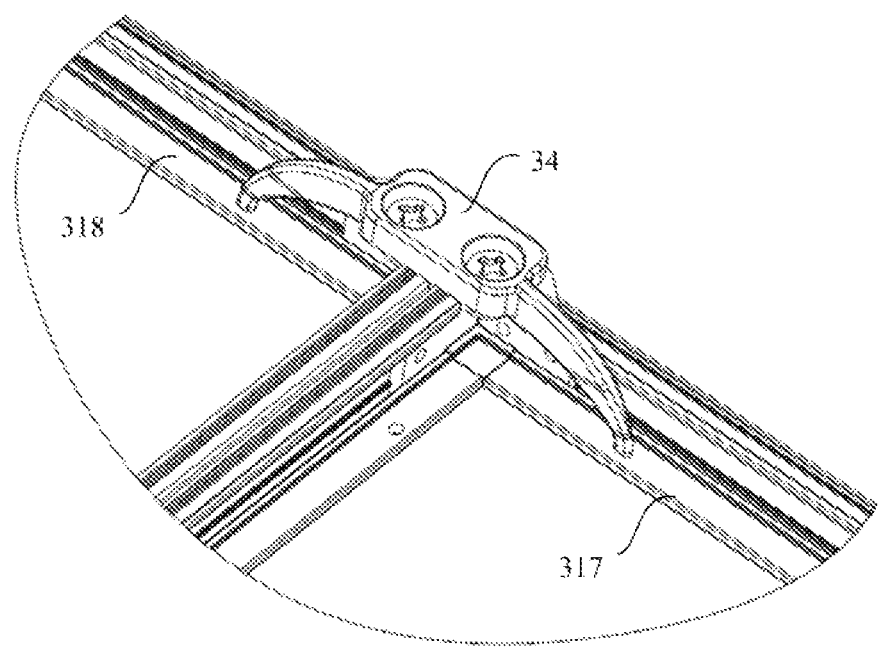
FIG. 11 is a schematic structural diagram of a joining structure between two LED panels of a lighting grid in a system for supplementing light to plants according to another embodiment of the invention.

Alike as illustrated in FIG. 11, the LED panel 317 and the LED panel 318, if adjacent, can also be joined by the joining member 34.

Preferably, referring to FIG. 9 and FIG. 10, the joining member 34 further includes clamps 342 to clamp the joining edges in the frames of the respective adjacent LED panels, e.g., the LED panel 313, the LED panel 314, the LED panel 315 and the LED panel 316 as illustrated in FIG. 10.

Figure 12:
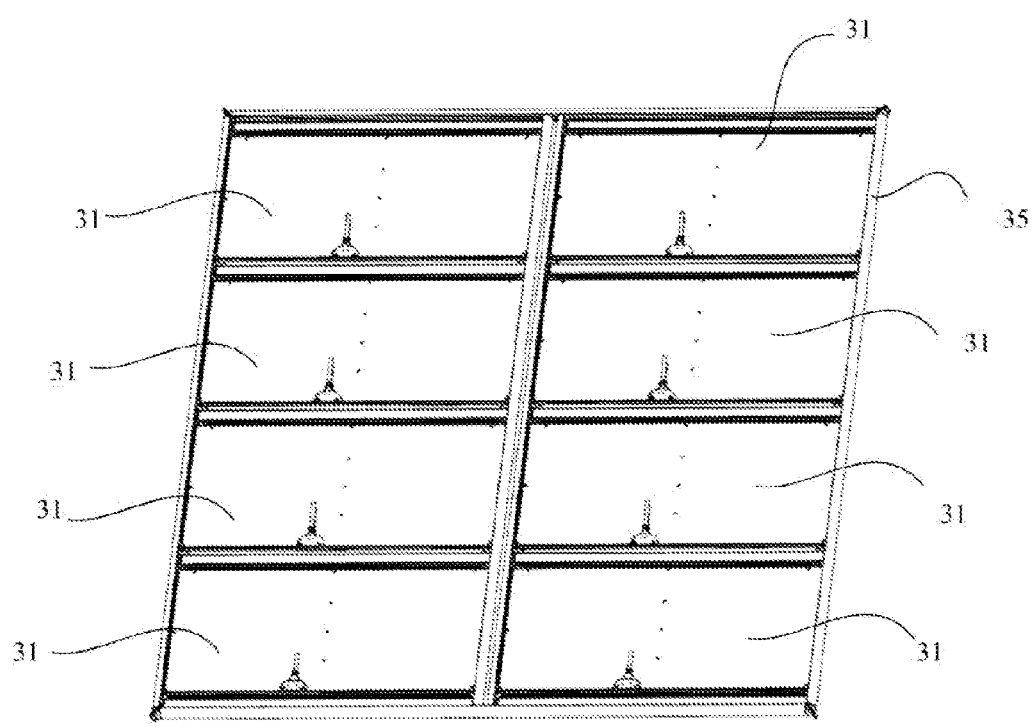
FIG. 12 is a schematic structural diagram of a joining structure between two LED panels of a lighting grid in a system for supplementing light to plants according to another embodiment of the invention.
Figure 13:
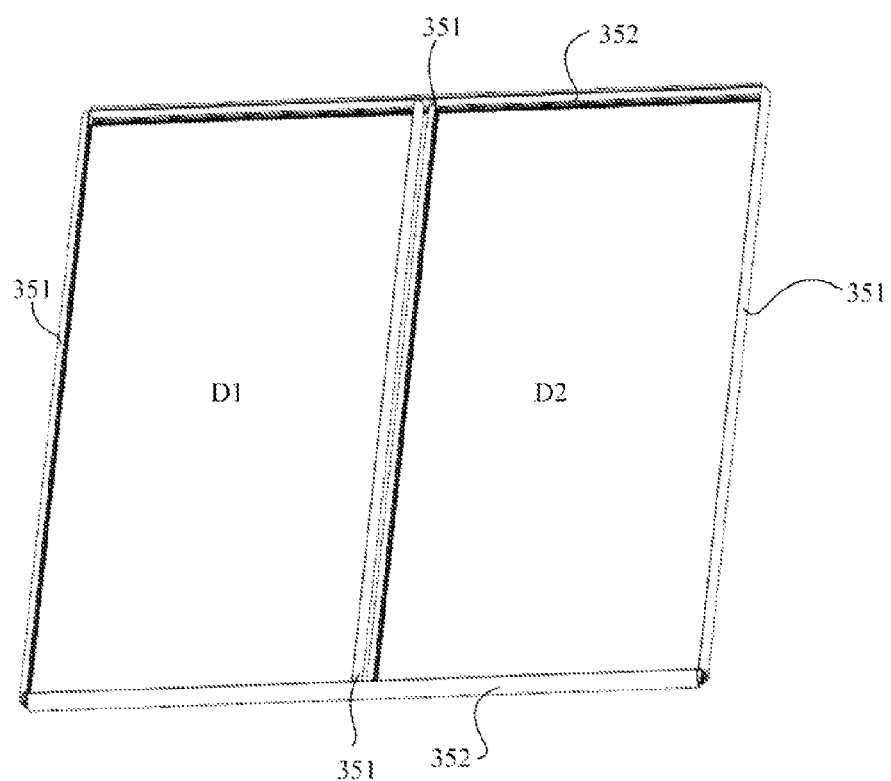
FIG. 13 is a schematic structural diagram of a joining member in the structure illustrated in FIG. 12.

In a third pattern, referring to FIG. 12 to FIG. 16, as illustrated in FIG. 13, the joining member 315 is structured in a frame including a plurality of limiting frames 351 parallel to each other and two blocking frames 352 parallel to each other, and each limiting frame 351 has one end fastened to one blocking frame 352 and the other end fastened to another blocking frame 352; and preferably each limiting frame 351 is perpendicular to the blocking frame 352. As illustrated in FIG. 12 and FIG. 13, regions, in which the plurality of LED panels 31 are joined, are formed by both the limiting frames 351 and the blocking frames 352, e.g., a joining region D1 and a joining region D2 as illustrated in FIG. 13.

Figure 14:
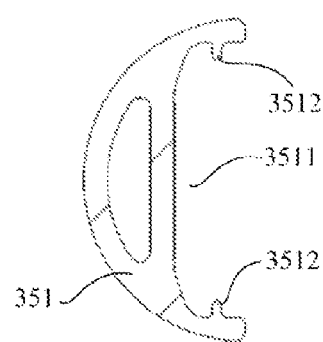
FIG. 14 is a sectional view of a limiting frame in a joining member in the structure illustrated in FIG. 13.
Figure 15:
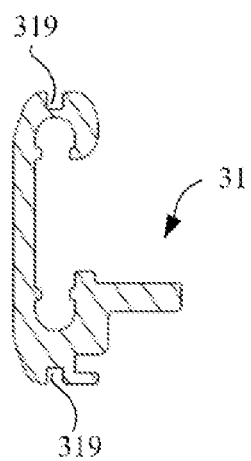
FIG. 15 is a section view of a joining edge-frame in LED panels engaged by the joining member in the structure illustrated in FIG. 14.
Figure 16:
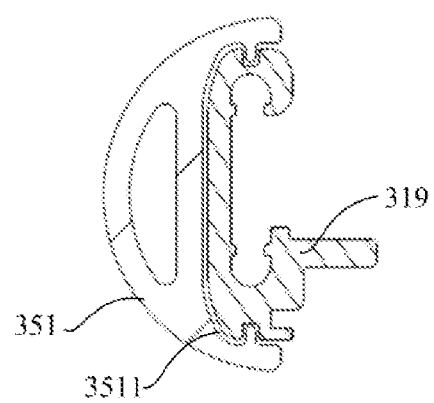
FIG. 16 is a schematic structural diagram of the joining edge-frame of the LED panel illustrated in FIG. 15 engaged with the limiting frame in the structure illustrated in FIG. 14.

As illustrated in FIG. 14, each limiting frame 351 is formed with a limiting slot 3511 extending in the lengthwise direction thereof, and each wall of the limiting frame 351 is formed with a limiting protrusion 3512 with the lengthwise direction thereof parallel to the lengthwise direction of the limiting frame 351; and as illustrated in FIG. 15 and FIG. 16, the edge of each LED panel 31 connected with the limiting frame 351 is located in the limiting slot 3511 arranged on the limiting frame 351 and is arranged with a steering slot 319 in sliding cooperation with the limiting protrusion 3512.

In a preferred embodiment, the system for supplementing light to plants above further includes a lifter connected with the lighting grid 3 to adjust the vertical height of the lighting grid 3 so as to facilitate adjusting the height of the lighting grid 3.

Particularly the lifter can include:

A drive shaft is fastened to a wall of a greenhouse;

A cord wound on the drive shaft has one end fastened to the drive shaft and the other end connected with a connector on the lighting grid 3, where the length of the cord extending beyond the drive shaft can be adjusted during rotation of the drive shaft around the rotation axis thereof; and A steering component fastened to the wall of the greenhouse includes a rotation axis vertically located immediately above the lighting grid 3 to steer the cord so that the section of the rode between the rotation axis and the lighting grid 3 extends vertically.

Thus the length of the section of the rode between the rotation axis and the lighting grid 3 and further the vertical height of the lighting grid 3 can be adjusted during rotation of the drive shaft.

In a preferred embodiment, in the lighting grid 3 of the system for supplementing light to plants, each LED lamp is a monochromatic light source, and the plurality of LED lamps emit light rays in various colors. In the system for supplementing light to the plants above, the LED lamps emitting light/colors that are advantageous to the plant's current growth phase can be increased using the variable controller on the power supply. Other less important LED colors can also be dimmed according to current growth phases. Being able to adjust the colors/spectrums and lighting radiation provided to the plants is desirable in different growing phases to thereby provide a more precise lighting spectrum to the plants and to increase total energy saving of the system for supplementing light to plants.

Preferably the system for supplementing light to plants above further includes:

A controller is connected in signaling with the power supply 1 to control the power supply to control the strengths of light rays emitted by the LEDs in the respective LED panels 31 separately according to pre-programmed light spectra which is user selectable.

The pre-programmed light/color emitted by the LED panels can also be manually adjusted by the user.

Some parameters can be preset in the controller by a user, and the controller controls the power supply 1 and further the system for supplementing light to plants automatically.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A system for supplementing light to plants, comprising a lighting grid and a power supply detachable from each other, wherein:
    the lighting grid comprises a plurality of LED panels, wherein a plurality of LED lamps are arranged in each LED panel, and any adjacent LED panels are joined to each other by a joining member; and
    the power supply is electrically connected with the LED lamps in the respective LED panels through a cable;
    the plurality of LED panels are distributed in an array, wherein any two adjacent LED panels in each row of LED panels are joined to each other, and any two adjacent LED panels in each column of LED panels are joined to each other; or the plurality of LED panels are arranged in a row, and any two adjacent LED panels are joined to each other;
    wherein each LED panel is provided with a frame comprising four edges connected end-to-end sequentially;
    wherein the first one of the four edges of the first one of any two adjacent LED panels is adjacent to the second LED panel, and the second one of the four edges of the second LED panel is adjacent to the first LED panel, and the first edge is arranged parallel to and against the second edge, and wherein:
    the lengthwise direction of the joining member is parallel to the lengthwise direction of the first edge, and the joining member is formed with a slot into which both the first edge and the second edge are inserted; and the slot has a first wall located on the side of the first edge away from the second edge and a second wall located on the side of the second edge away from the first edge, and the first wall is arranged against and engaged with the surface of the first edge away from the second edge, and the second wall is arranged against and engaged with the surface of the second edge away from the first edge.

2. The system for supplementing light to plants according to claim 1, wherein the first wall is arranged against and engaged with the surface of the first edge away from the second edge and the second wall is arranged against and engaged with the surface of the second edge away from the first edge in such a way that:
    the surface of the first edge away from the second edge is formed with limiting slot;
    the surface of the second edge away from the first edge is formed with a limiting slot;
    the first wall is formed with a first limiting block engaged with the limiting slot of the first edge; or the first wall is formed with an adjustable bolt comprising an inner end inserted into the slot and arranged against with the bottom of the limiting slot of the first edge and engaged with the limiting slot of the first edge; and
    the second wall is formed with a second limiting block engaged with the limiting slot of the second edge.

3. The system for supplementing light to plants according to claim 1, wherein the first wall is arranged against and engaged with the surface of the first edge away from the second edge and the second wall is arranged against and engaged with the surface of the second edge away from the first edge in such a way that:
    the surface of the first edge away from the second edge is formed with a limiting slot;
    the surface of the second edge away from the first edge is formed with a limiting slot;
    the first wall is formed with a limiting slot engaged with a limiting block formed on the first edge; and
    the second wall is formed with a limiting slot engaged with a limiting block formed on the second edge.

4. The system for supplementing light to plants according to claim 1, wherein the system further comprises a lifter connected with the lighting grid to adjust the vertical height of the lighting grid.

5. The system for supplementing light to plants according to claim 1, wherein each LED lamp in the lighting grid is a monochromatic light source, and the plurality of LED lamps emit light rays in various colors.

6. The system for supplementing light to plants according to claim 5, further comprising:
    a controller connected in signaling with the power supply to control the power supply to control the strengths of light rays emitted by the LEDs in the respective LED panels separately according to a preset rule.

7. The system for supplementing light to plants according to claim 4, wherein the lifter further comprises:
    a drive shaft fastened to a wall of a greenhouse where the plants are grown;
    a cord, wound on the drive shaft, with one end fastened to the drive shaft and the other end connected with the lighting grid; and
    a steering component, fastened to the wall of the greenhouse, comprising a rotation axis vertically located immediately above the lighting grid to steer the cord so that the section of the rode between the rotation axis and the lighting grid extends vertically.

8. A system for supplementing light to plants, comprising a lighting grid and a power supply detachable from each other, wherein:
    the lighting grid comprises a plurality of LED panels, wherein a plurality of LED lamps are arranged in each LED panel, and any adjacent LED panels are joined to each other by a joining member; and
    the power supply is electrically connected with the LED lamps in the respective LED panels through a cable;
    the plurality of LED panels are distributed in an array, wherein any two adjacent LED panels in each row of LED panels are joined to each other, and any two adjacent LED panels in each column of LED panels are joined to each other; or the plurality of LED panels are arranged in a row, and any two adjacent LED panels are joined to each other;
    wherein each LED panel is provided with a frame comprising four edges connected end-to-end sequentially;
    wherein adjacent corners in any adjacent LED panels are fastened to each other by one of the joining members to have the adjacent LED panels joined to each other, and wherein the joining member comprises:
    fasteners, comprising fastening holes, arranged at the corners of the frames of the LED panels; and
    a connection plate, comprising vias corresponding to the fastening holes, fastened to the fasteners by connection bolts;

wherein the joining member further comprises clamps to clamp the joining edges in the frames of the respective adjacent LED panels.

9. The system for supplementing light to plants according to claim 8, wherein the system further comprises a lifter connected with the lighting grid to adjust the vertical height of the lighting grid.

10. The system for supplementing light to plants according to claim 9, wherein the lifter further comprises:
   a drive shaft fastened to a wall of a greenhouse where the plants are grown;
   a cord, wound on the drive shaft, with one end fastened to the drive shaft and the other end connected with the lighting grid; and
   a steering component, fastened to the wall of the greenhouse, comprising a rotation axis vertically located immediately above the lighting grid to steer the cord so that the section of the rode between the rotation axis and the lighting grid extends vertically.

11. The system for supplementing light to plants according to claim 8, wherein each LED lamp in the lighting grid is a monochromatic light source, and the plurality of LED lamps emit light rays in various colors.

12. The system for supplementing light to plants according to claim 11, further comprising:
   a controller connected in signaling with the power supply to control the power supply to control the strengths of light rays emitted by the LEDs in the respective LED panels separately according to a preset rule.

* * * * *